Jan. 12, 1954 T. G. KINSLEY ET AL 2,666,196

FREQUENCY STATION CALLING SYSTEM USING BIFURCATED PIEZOELECTRIC ELEMENTS

Filed June 7, 1949

3 Sheets-Sheet 1

INVENTORS T. G. KINSLEY
W. P. MASON
BY J W Schmied
ATTORNEY

Jan. 12, 1954 — T. G. KINSLEY ET AL — 2,666,196

FREQUENCY STATION CALLING SYSTEM USING BIFURCATED PIEZOELECTRIC ELEMENTS

Filed June 7, 1949 — 3 Sheets-Sheet 2

INVENTORS T. G. KINSLEY
W. P. MASON

BY J. W. Schmied

ATTORNEY

INVENTORS T. G. KINSLEY
W. P. MASON
BY J W Schmied
ATTORNEY

Patented Jan. 12, 1954 2,666,196

UNITED STATES PATENT OFFICE 2,666,196

FREQUENCY STATION CALLING SYSTEM USING BIFURCATED PIEZOELECTRIC ELEMENTS

Thomas G. Kinsley, Plainfield, and Warren P. Mason, West Orange, N. J., assignors to Bell Telephone Laboratories, Incorporated, New York, N. Y., a corporation of New York Application June 7, 1949, Serial No. 97,592

4 Claims. (Cl. 340—171)

This invention relates to electrical signaling systems, and more particularly to a piezoelectric controlled selective signaling system.

An object of the invention is to provide a selective signaling system employing vibrating piezoelectric relays as frequency selective means.

Another object of the invention is to provide an improved form of vibrating piezoelectric relay which is more stable mechanically, more sensitive electrically, and more constant in frequency response over a wider range of temperature variation than other piezoelectric relays heretofore available.

An additional object is to provide a frequency division signaling system without relay contacts.

A further object is to provide a system in which station calling may be accomplished by use of very high frequency calling currents.

A still further object is to provide a station calling system which is capable of responding to selective signals more quickly than other systems heretofore available.

This invention relates to improvements in selective signaling systems of the type disclosed in Patent 2,602,853 issued to H. C. Harrison, July 8, 1952. In the invention piezoelectric crystal relays having higher Q and higher impedance characteristics than are available with the tuned magnetic vibrators of Harrison are employed as multifrequency calling signal selectors. To this end the present invention discloses new forms of piezoelectric relays which embody several improvements over the piezoelectric relays described in Patents 2,166,763 and 2,195,417, issued July 18, 1939, and April 2, 1940, respectively, to W. P. Mason. Among the difficulties encountered with the former piezoelectric relays were their susceptibility to temperature changes which resulted in unwanted variations in their natural vibratory frequencies, their susceptibility to mechanical shock and/or vibration, which might result in false operation of the relay or physical damage to the crystal structure itself, and the considerable stress to which the crystal must be subjected in order to produce a physical motion adequate to operate the contacts, this great stress frequently producing a rupture of the crystal. In the improved piezoelectric relay herein disclosed, these former difficulties have been overcome. Greater sensitivity and reliability are obtained by employing crystals of ethylene diamine tartrate. In a preferred embodiment of the selective signaling system which is the subject of this invention, the difficulties associated with vibrating relay contacts have been overcome by eliminating vibrating contacts entirely.

Further objects and advantages will become apparent upon consideration of the following description and drawings wherein.

Although the invention is considered to be particularly well adapted to mobile radio station calling or to telephone party line ringing, the invention is not limited to such applications but may be employed for telegraph signaling, or for transmitting any form of intelligence either over radio or metallic circuits.

Figure 1:
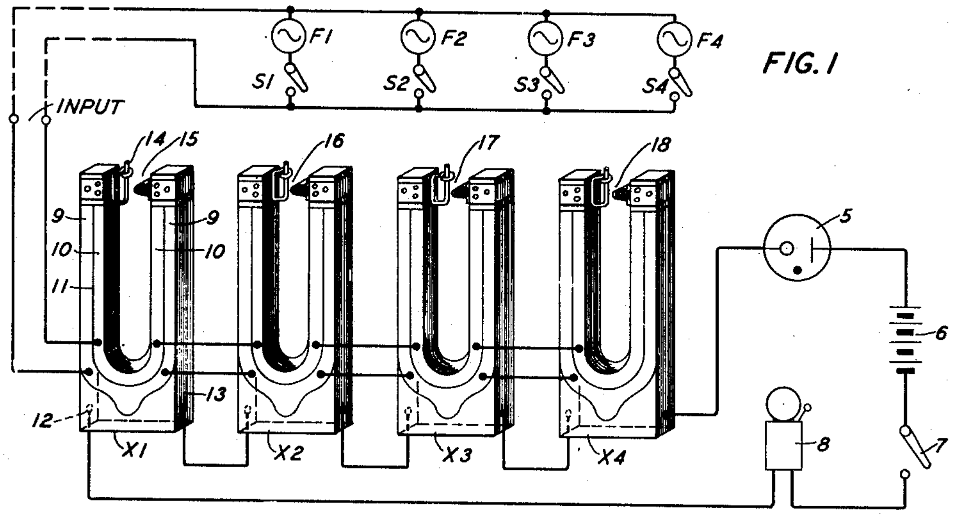
Fig. 1 is a pictorial view of the piezoelectric crystal relays and a circuit representation of a selective signaling circuit associated therewith.

Fig. 1 illustrates four bifurcated piezoelectric crystal relays, $X_1$, $X_2$, $X_3$ and $X_4$, each of which is cut in the form of a tuning fork, having relay contacts mounted on the opposite branches thereof, the operating electrodes of the crystal relays being connected in parallel to a source of four alternating electrical potentials of frequencies $F_1$, $F_2$, $F_3$ and $F_4$, and the relay contacts of the crystal relays being connected in series through a thyratron or gas discharge tube 5, battery 6 and switch 7, to indicating device 8. The details of the individual crystal relay structure are clearly disclosed by $X_1$ wherein a pair of operating electrodes of conductive material, which may be either sprayed, painted, or cemented to the surface of the piezoelectric crystal, are represented by the surfaces 9 and 10, insulated from each other by space 11. An additional pair of electrodes represented by conductive surfaces 12 and 13 applied to opposite edges of the crystal in such manner as to be insulated from each other and from the operating electrodes 9 and 10, provide means for external connection to the vibrating contacts 14 and 15, respectively. Identical conducting surfaces are applied to the corresponding portions of crystal relays $X_2$, $X_3$ and $X_4$. The source of frequencies $F_1$, $F_2$, $F_3$ and $F_4$ is connected through switches $S_1$, $S_2$, $S_3$ and $S_4$ to the relays $X_1$, $X_2$, $X_3$ and $X_4$, connected in parallel through the line designated "input." The input lead connected to the switches $S_1$ through $S_4$ is connected to the conductive surface 10 of relay $X_1$, to the similar surfaces successively of the relays $X_2$, $X_3$ and $X_4$ and back through the surfaces 9 thereof to the source of frequencies $F_1$ through $F_4$. The output circuit is from switch 7 through the battery 6, the thyratron 5, the surface 13 of relay $X_4$, contact 18, the surface 12 of relay $X_4$ and similarly through the surfaces 13 and 12 of relays $X_3$, $X_2$ and $X_1$ and the corresponding contacts 17, 16 and 15, through the indicating device 8 back to the switch 7.

Figure 2:
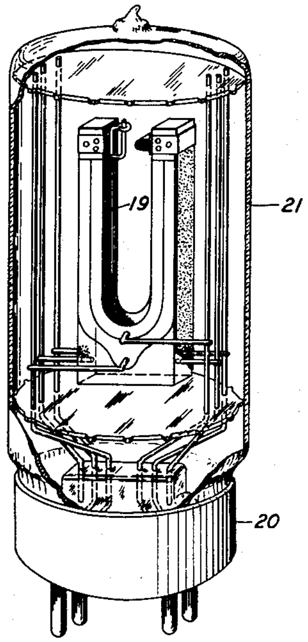
Fig. 2 is a partial pictorial view of a vibrating crystal relay element of the present invention.

Fig. 2 illustrates the manner in which a vibrating crystal relay element may be mounted on a standard-type tube base and enclosed within a glass envelope which may be either evacuated or filled with an inert gas. Such an arrangement is desirable to protect the crystal relay from dirt and moisture, and to prevent sparking at the vibrating contacts.

Figure 3:
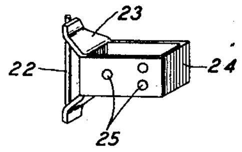
Fig. 3 is a pictorial view of a form of a contact of the vibrating relay depicted in Figs. 1 and 2.

Fig. 3 illustrates one form of vibrating relay contact wherein a lightweight contact wire 22 may be secured by spot-welding or other convenient means to a lightweight metallic bracket 23, a portion of which is formed into a collar 24 suitable for slipping over one end of the bifurcated relay crystal and to be secured to the crystal by suitable means through holes 25.

Figure 4:
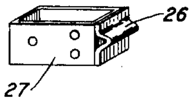
Fig. 4 is an enlarged pictorial view of the cooperating contact of said relay.

Fig. 4 illustrates in detail one form of the cooperating contact wherein an anvil-shaped metallic member 26 is secured to a collar 27 suitable for slipping over the opposite branch of the bifurcated relay crystal structure.

Figure 5:
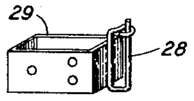
Fig. 5 is a pictorial view of a modification of said contact.

Fig. 5 illustrates an alternative form of lightweight wire contact 28 secured to a mounting collar 29 which will afford an even greater flexible mating with the cooperating contact shown in Fig. 4 than the lightweight wire structure of Fig. 3.

Figure 6:
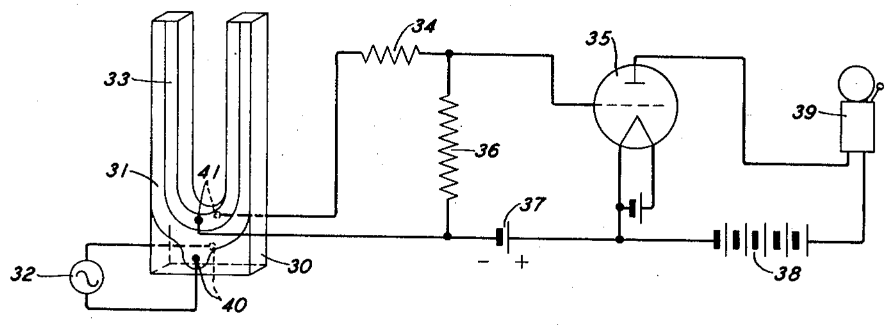
Fig. 6 is a circuit diagram of an exemplary form of the selective signaling circuit utilizing said relay.
Figure 7:
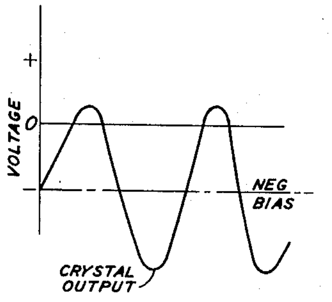
Fig. 7 is a grid voltage versus time curve illustrating the operation of a selective signaling circuit according to the present invention.

Fig. 6 illustrates a selective signaling circuit controlled by a bifurcated piezoelectric crystal 30 which here functions as a frequency sensitive relay without having vibrating contacts of the types shown in Figs. 1, 2, 3, 4 and 5. Here it will be seen that the piezoelectric crystal 30 is coated with one pair of conducting surfaces 31 connected to a source of alternating electrical potential 32, and another pair of electrodes or conductive surfaces 33 insulated from conductors 31 and connected through resistor 34 to the grid of vacuum tube 35. In this circuit resistor 36 provides a path for applying negative bias from battery 37 to the grid of vacuum tube 35. In the plate circuit are B battery 38 and indicating device 39. In the operation of Fig. 6 alternating electrical potential from generator 32 is applied across the terminals 40 which are in contact with the conductive surfaces 31 of the crystal element. When the frequency of potential from generator 32 coincides with the natural vibratory frequency of the crystal element, the crystal is set into motion and another voltage, generated by the piezoelectric effect, appears across terminals 41 in contact with conductive surfaces 33. During a portion of each alternating cycle the magnitude and polarity of voltage generated across terminals 41 is sufficient to cancel the effect of negative bias from battery 37 and thereby to cause plate current to flow through tube 35, thus operating the indicating device 39. The manner in which this alternating voltage is superimposed upon the negative tube bias is illustrated graphically by Fig. 7.

Although the frequency division crystal relay 30 of Fig. 6 is illustrated as being cut in the form of a tuning fork, this particular configuration is not essential to the operation of our invention, but the crystal may be cut in the more conventional rectangular form of the bimorph-type crystal element, or it may be of the flexure type, or longitudinal type of crystal element, all of which forms are well known in the art.

Figure 8:
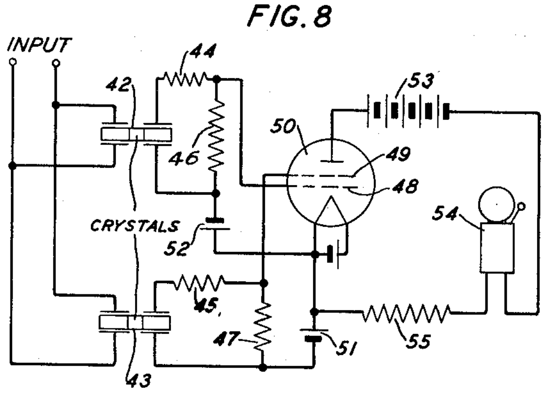
Fig. 8 is a circuit representation of the selective signaling circuit of the present invention.

Fig. 8 illustrates a circuit employing two frequency division crystal relays similar to the type illustrated by 30 in Fig. 6. Here it is seen that two crystals 42 and 43 are connected through appropriate resistors 44 and 45 to the control grids 48 and 49 of the twin-grid tube 50. Negative bias is applied to grid 48 from battery 52 through resistor 46, and similar negative bias is supplied to grid 49 from battery 51 through resistor 47. The plate circuit includes limiting load resistor 55, indicating device 54, and B battery 53. The operation of the circuit of Fig. 8 is similar to that discussed with reference to Fig. 6 except that here both crystals 42 and 43 must be set into vibration simultaneously in order to overcome the negative bias imposed on the dual grid control tube 50 and thereby cause plate current to flow in the plate circuit to operate indicating device 54. This condition occurs only when the input signal applied to the two pairs of driving electrodes of crystals 42 and 43 comprises at least two voltages corresponding in frequency to the natural vibratory periods of the crystals 42 and 43.

Figure 9:
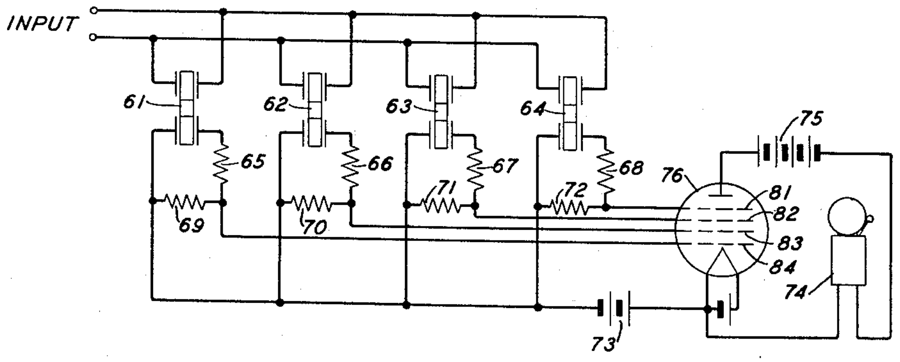
Fig. 9 is a circuit representation of a modification of the selective signaling circuit of the present invention.

Fig. 9 illustrates still another selective signaling circuit in which four frequency division crystal relays 61, 62, 63 and 64 have their driving electrodes connected in parallel to a common input terminal, and their secondary electrodes connected through suitable resistances to the four control grids 81, 82, 83 and 84 of vacuum tube 76. Negative bias is applied to the grids from battery 73 through resistances 69, 70, 71 and 72, respectively, so that no plate current flows from battery 75 through tube 76 unless all four control grids 81 through 84 have their negative biases simultaneously neutralized. Thus, it may be readily seen that unless the alternating voltage applied to the circuit input of Fig. 9 comprises all four frequencies to which the four piezoelectric crystals 61, 62, 63 and 64 are tuned, the negative bias will not be neutralized on all four grids 81 through 84 and signaling device 74 will remain unoperated. However, if all four crystals 61 through 64 are simultaneously vibrated by the application of an appropriate combination of alternating voltages across the input terminals then and only then will the four control grids 81 through 84 be simultaneously affected so as to permit plate current to flow from battery 75 through vacuum tube 76 and thereby operate indicating device 74.

Figure 10:
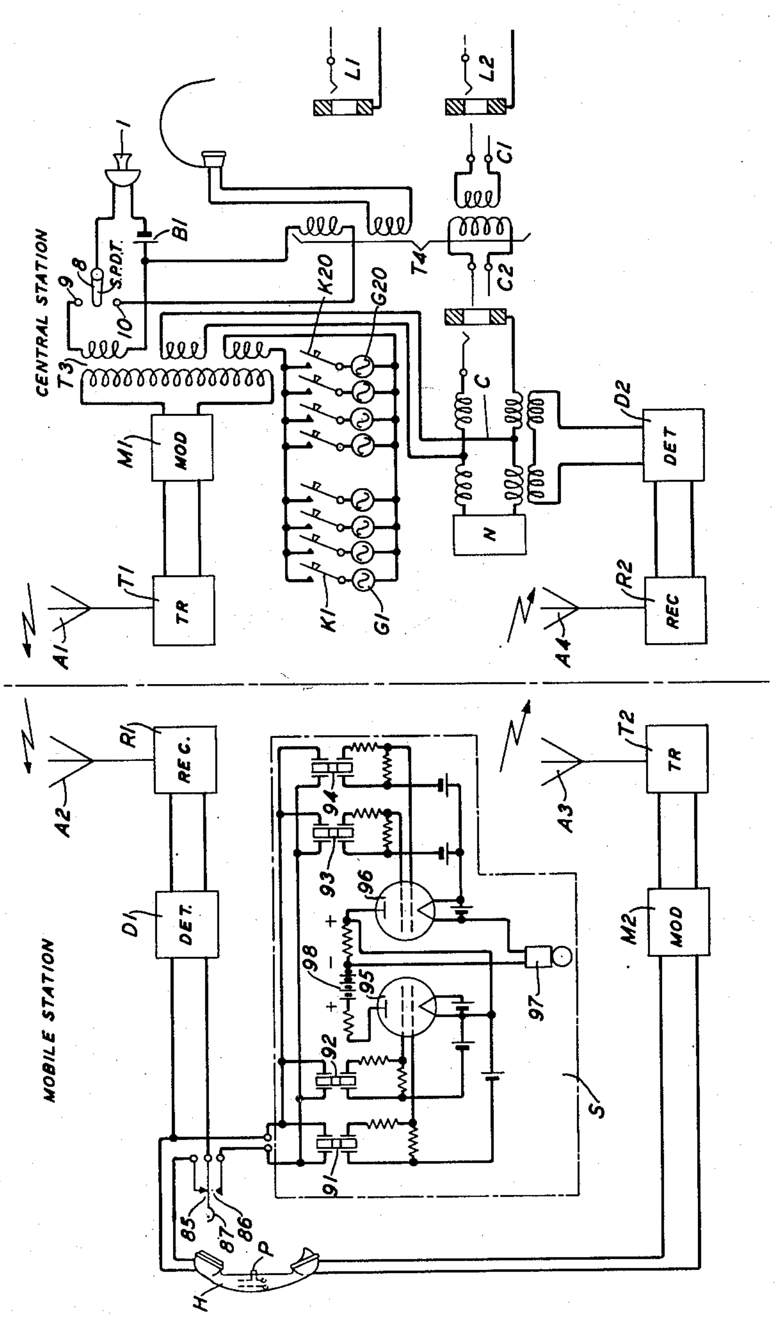
Fig. 10 is a circuit diagram of still another modification of a selective signaling circuit of the present invention together with a circuit representation of the central station.

Fig. 10 illustrates still another form of our invention as it may be employed in a complete mobile radio telephone signaling system. The right-hand side of Fig. 10 represents a central office position as heretofore disclosed in Patent 2,602,853 issued to H. C. Harrison, July 8, 1952, wherein a plurality of tone generators G1 to G20 are individually controlled by a plurality of keys K1 to K20 whereby the mobile service operator may cause the central office transmitter T1 to be modulated by any combination of audio tones depending upon the combination of keys which she may operate. The left-hand side of Fig. 10 illustrates the essential elements of a mobile subscriber's station in which receiver R1 and detector D1 are connected through switchhook 87 to the input terminals of the selector circuit S which discloses a variation of the circuit shown in Fig. 9. Here it will be seen that four frequency division relays 91, 92, 93 and 94 are arranged with their driving electrodes connected in parallel to the input terminals, and their secondary or output electrodes connected through suitable resistors to the control grids of two vacuum tubes 95 and 96 so arranged that when both tubes are fired, the plate current flowing through both tubes will operate indicating device 97. The system of Fig. 10 contemplates the simultaneous transmission of four signaling frequencies from the central office and, when these four frequencies as received at the mobile station correspond to the frequencies to which the four crystal relays 91, 92, 93 and 94 are responsive, and only then, will the signaling device 97 be operated. With such a system employing the simultaneous transmission of four frequencies selected from a source of twenty available signal frequencies, a very large number of different combinations may be obtained so that the system is capable of accommodating a great many outlying stations all interconnected by a common transmission medium, and yet each station may be individually signaled. The capacity of the system may be further increased, if desired, by the simple expedient of adding signal frequency sources at the central office and providing additional outlying stations with signal selectors tuned to various combinations of the signal frequencies so provided.

The use of piezoelectric frequency division selectors, or piezoelectric crystal relays, in any of the arrangements herein disclosed affords more accurate frequency selection and more rapid signaling response than has heretofore been possible in any of the prior systems of multifrequency signaling employing tuned reed relays, or tuned filter circuits with untuned relays, because the piezoelectric crystal elements have a much sharper frequency response which permits their operation with much closer frequency spacing, and also because when energized with potential of the correct frequency they respond very quickly without the build-up delay which is inherent in magnetic selectors. With the frequency division selectors of Figs. 6, 8, 9 and 10, which operate without vibrating contacts, the response to a signal comprising the correct frequencies is virtually instantaneous.

A further improvement which is realized by the invention is a substantial reduction in the power requirements for selective signaling. Inasmuch as the piezoelectric selectors are potential operated and draw practically no current, they require much less power than any of the elctromagnetic selectors of the prior art.

Another significant advantage of the piezoelectric selector circuits of the invention is their stable operation at frequencies which may extend considerably above the audible range, so that an entire new band of useful frequencies is made available to the station signaling art.

The operator's keyset shown in the central office portion of Fig. 10 may be replaced by a conventional telephone dial in connection with a dial pulse sender and translator of the type disclosed in the copending application of D. F. Hoth and R. O. Soffel, Serial No. 56,186, filed October 23, 1948, now abandoned.

The sources of multiple frequency signaling currents, G1 to G20 in Fig. 10, may be of the type disclosed by Patent No. 2,503,371 issued to A. E. Bachelet, April 11, 1950, as transmitted through sharply selective circuits of the type disclosed by L. G. Bostwick in Patent 2,630,482 which issued March 3, 1953, or they may be tuned oscillator circuits employing vacuum tubes and/or piezoelectric crystals, or any other suitable source of alternating currents of the desired frequencies.

It will be apparent that modifications and variations of the arrangements herein disclosed may be made by those skilled in art art without departing from the scope of the invention.

What is claimed is:

1. In a station calling system, a selector comprising a plurality of bifurcated piezoelectric elements adapted to respond to alternating electrical potentials of a distinctive frequency for each element, means for simultaneously energizing said elements in response to received signals of corresponding frequencies, the energization of each of said crystals providing an alternating current and potential of a frequency distinctive to said element, and call indicating means operable by the simultaneous alternating potentials from all of said piezoelectric elements.

2. In a selective signaling system, a selector comprising a plurality of U-shaped piezoelectric elements each responsive to alternating electrical potentials of a distinctive frequency, where at least one of said frequencies is substantially above the audio range, means for applying alternating electrical potentials of selected frequencies to said elements, the energization of each of said crystals providing an alternating potential of a frequency distinctive to said element, and means controlled by simultaneous applications of a plurality of potentials of frequencies distinctive to all of said elements for producing a signal indication.

3. In a signaling system, a multifrequency selector comprising a plurality of U-shaped piezoelectric crystals each adapted to oscillate when energized by an alternating electrical potential of a distinctive frequency, a first pair of electrodes associated with each of said crystals and connected to a common input circuit, a second pair of electrodes associated with each of said crystals but insulated from said first pair of electrodes, a separate output circuit connecting each of said second pairs of electrodes with a detecting means adapted to permit current flow therethrough only when impressed simultaneously with potentials from all of said piezoelectric crystals, and signal indicating means connected with said detecting means and operable thereby upon simultaneous detection of potentials from all of said crystals.

4. A frequency selective system comprising a plurality of selective relays, each comprising a bifurcated piezoelectric crystal element, first and second pairs of electrically conductive surfaces affixed to opposite parallel faces of said crystal element, said surfaces insulated from each other but in intimate contact with a substantial area of said crystal, said crystal ground to a precise dimension between said opposite parallel faces to determine a vibratory period at which said crystal may be caused to oscillate, and electrical terminals associated with each of said conductive surfaces for establishing external connections thereto, an external source of electrical energy connected to one pair of said terminals of each of said selective relays, an amplifier connected to the other pair of said terminals of each of said selective relays, and a load device connected with the output of said amplifiers, whereby upon application of external electrical stimulus of a plurality of predetermined frequency characteristics approximating said vibratory periods to which said crystals are ground to said one pair of terminals of each of selective relays, said crystals are caused to oscillate at their predetermined oscillatory frequencies and piezoelectric potentials across all of said other pairs of said terminals are amplified to operate said load device.

THOMAS G. KINSLEY.
WARREN P. MASON.

References Cited in the file of this patent

UNITED STATES PATENTS

| Number | Name | Date |
|---|---|---|
| Re. 17,355 | Cady | July 2, 1929 |
| 1,902,184 | Rieber | Mar. 21, 1933 |
| 2,033,631 | Gruetzmacher | Mar. 10, 1936 |
| 2,081,405 | Mason | May 25, 1937 |
| 2,148,578 | Pullis | Feb. 28, 1939 |
| 2,173,154 | Bernard | Sept. 19, 1939 |
| 2,185,599 | Mason | Jan. 2, 1940 |
| 2,230,649 | Mason | Feb. 4, 1941 |
| 2,286,436 | Odell | June 16, 1942 |
| 2,431,167 | Byrnes | Nov. 18, 1947 |
| 2,457,149 | Herbst | Dec. 28, 1948 |
| 2,472,715 | Mason | June 7, 1949 |
| 2,472,753 | Mason | June 7, 1949 |
| 2,500,212 | Starr | Mar. 14, 1950 |
| 2,591,937 | Herrick | Apr. 8, 1952 |

FOREIGN PATENTS

| Number | Country | Date |
|---|---|---|
| 261,384 | Great Britain | Oct. 6, 1927 |

OTHER REFERENCES

Cady: Piezoelectricity, 1946, pages 667–669, McGraw-Hill Book Co. Inc.